United States Patent [19]

Bader, deceased et al.

[11] 4,199,285
[45] Apr. 22, 1980

[54] MACHINING UNIT HAVING ADJUSTABLE CUTTER SPINDLE

[75] Inventors: Eugen Bader, deceased, late of Rottweil, Fed. Rep. of Germany; by Antonie Bader, administratix, Saline 14, 7210 Rottweil, Fed. Rep. of Germany; Kurt Jauch, Metzingen, Fed. Rep. of Germany

[73] Assignee: Antonie Bader, Rottweil, Fed. Rep. of Germany

[21] Appl. No.: 916,677

[22] Filed: Jun. 19, 1978

[30] Foreign Application Priority Data

Jun. 20, 1977 [DE] Fed. Rep. of Germany ....... 2727645

[51] Int. Cl.² .......................... B23C 1/02; B23B 47/16
[52] U.S. Cl. ..................................... 409/206; 409/230; 408/20; 408/128; 173/29
[58] Field of Search ...................... 408/234, 124, 128; 173/29; 90/11 R, 14, 16

[56] References Cited

U.S. PATENT DOCUMENTS

2,374,764  5/1945  Mathys ............................... 90/14 X

FOREIGN PATENT DOCUMENTS

2341039  2/1975  Fed. Rep. of Germany .......... 90/11 R
1382111 11/1964  France ............................ 90/14
573796  3/1976  Switzerland .

*Primary Examiner*—Gil Weidenfeld
*Attorney, Agent, or Firm*—Karl W. Flocks

[57] ABSTRACT

A machining unit with a working spindle supported in a spindle housing and a saddle on which the spindle housing is removably secured and which is guided on a saddle carrier for sliding movement axially of the working spindle to cause the working spindle to be moved by feed motions, and with a drive motor secured to the saddle carrier and a transmission driven by the drive motor, the transmission having a hollow shaft in which the working spindle is guided for axial sliding movement and for rotation by the hollow shaft supported in a holder adjustable and lockable relative to the saddle carrier in two directions perpendicular to the axial direction of the working spindle.

9 Claims, 5 Drawing Figures

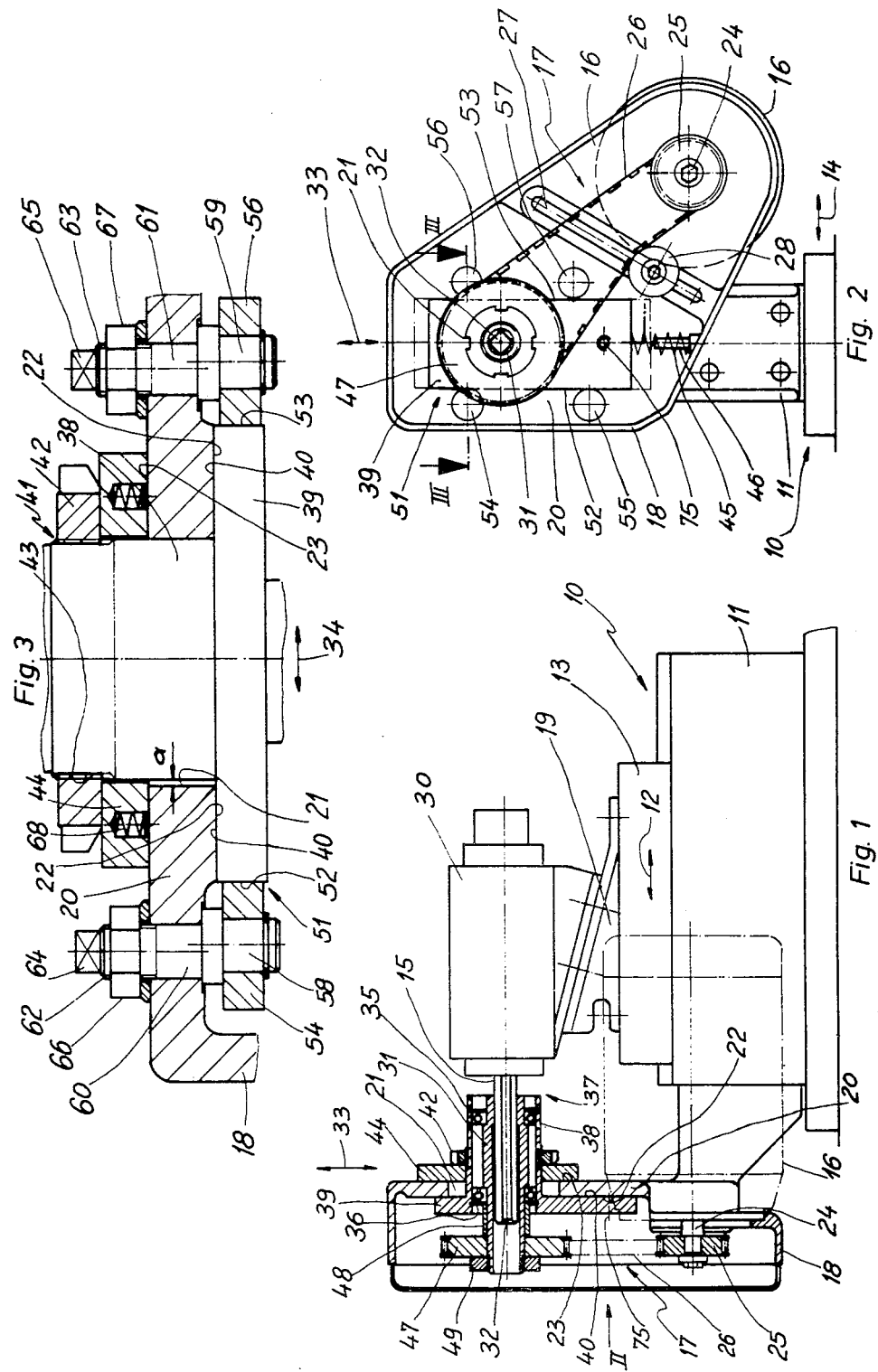

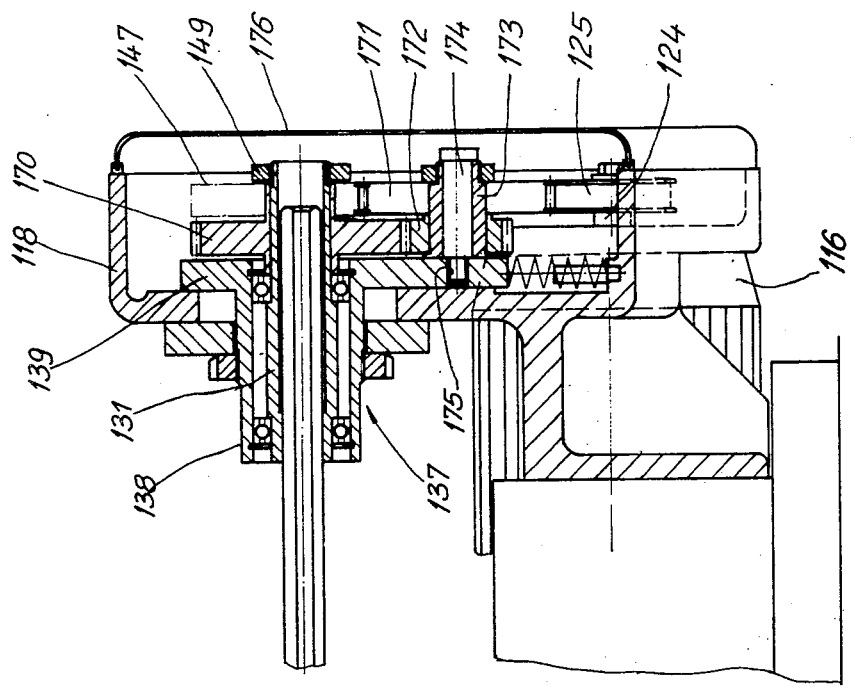
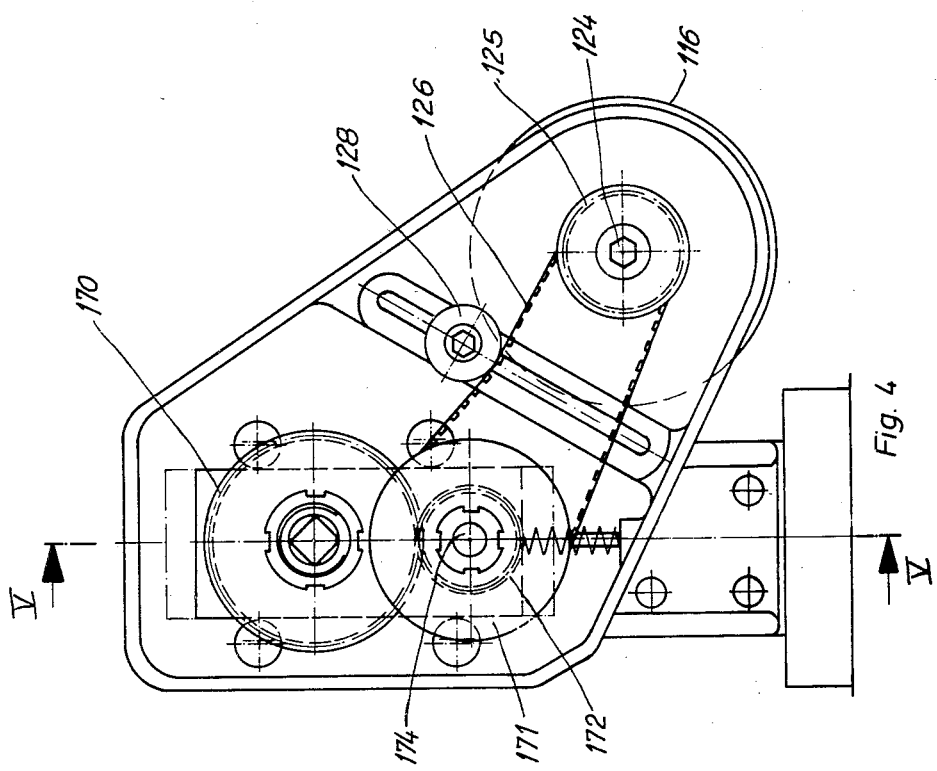

MACHINING UNIT HAVING ADJUSTABLE CUTTER SPINDLE

BACKGROUND OF THE INVENTION

1. Field of the Invention

The invention relates to a machining unit, particularly for transfer machines, comprising a working spindle supported in a spindle housing, a saddle on which the spindle housing is removably secured and which is guided on a saddle carrier for sliding movement axially of the working spindle to cause the working spindle to be moved by feed motions, a drive motor secured to the saddle carrier and a transmission driven by the drive motor, the transmission having a hollow shaft in which the working spindle is guided for axial sliding movement and for rotation by the hollow shaft.

2. Description of the Prior Art

The U.S. patent No. 2,190,284 describes a machining unit of the above kind in which the hollow shaft is directly and stationarily supported in the saddle carrier, whereby fixed relative positions are established for the hollow shaft and guides defined on the saddle carrier, on which guides the saddle is guided for sliding movement. The sliding movement of the saddle is obtained from a double-acting piston and cylinder unit of which the piston is secured to the saddle and the cylinder is fixedly connected to the saddle carrier.

The only element which participates in the sliding movements of the saddle is the spindle housing together with the working spindle supported therein and a boring chuck fixed to the working spindle and carrying a boring tool clamped therein, whereas the drive motor and the transmission do not change their position relative to the saddle carrier. One result of this is that the axial movements of the working spindle are followed by relatively small masses of inertia only; thus, these movements admit important accelerations and decelerations. On the other hand, the spindle housing which moves together with the working spindle in the axial direction of the latter and the saddle conjointly ensure an always equally efficient support of the working spindle; consequently, resulting forces of the metal removing process which act upon the working spindle in the axial direction, on the one hand, and the feed forces transmitted from the piston and cylinder unit to the saddle, on the other hand, cannot produce but small deformations the extent of which is exactly predictable, since for a given amount of the forces they will be of the same importance in any position of the saddle. In principle, the known machining unit is thus suitable not only for boring work, but also for other metal removing operations such as turning and milling. However, the universal use of the known machining unit is opposed by the fact that the working spindle must be arranged at an exactly determined distance from the guides provided for the saddle on the saddle carrier, and that there is hardly two spindle housings to be found having mating dimensions which could be considered as being of the same value within sufficiently close tolerances. Therefore, after having replaced a spindle unit with another one, one cannot be sure that the working spindle and its driving hollow shaft will cooperate without any jamming.

Admittedly, such difficulties which prevent the replacement of spindle units with each other are avoided in machining units of the kind described in the Swiss patent specification No. 573,796 in which a working spindle is mounted axially non-slidable in a spindle housing which, in turn, is replaceably secured to a saddle which is slidable in a direction parallel to the spindle axis for obtaining the feed movements of the working spindle, the spindle housing further carrying a transmission with a drive motor flange-mounted thereto. The connection between the working spindle and the drive motor is maintained both during the replacement of the spindle unit as well as during each and every conceivable displacement of the spindle unit; one resulting advantage from this is that there is no danger of jamming between the working spindle and its driving transmission elements, but, on the other hand, one must accept the drawback which consists in that the drive motor and the transmission participate, with their relatively large inert mass, in each and every axial movement of the working spindle and thus do not allow axial displacements to be made by rapid motion under heavy accelerations and decelerations.

SUMMARY OF THE INVENTION

It is the object of the invention to provide a machining unit which combines the advantages of the two known machining units described above, that is, while maintaining an always equally efficient support of the working spindle, to provide, on the one hand, for an easy adaptation to different machining problems even in the case where replacement or additional components of moderate accuracy must be used therefor and, on the other hand, to enable rapid axial movements of the working spindle with only small inert masses to be moved.

In accordance with the invention, in a machining unit of the kind set forth the hollow shaft is supported in a holder which is adjustable and lockable relative to the saddle carrier in two different directions perpendicular to the axial direction of the working spindle.

By releasably securing the spindle housing to the saddle it is possible, in a manner known per se, to replace a spindle unit designed, for example, to do boring work and consisting of a spindle housing and a working spindle, with another spindle unit which may be suitable for milling. However, it is also possible to mount one and the same spindle unit selectively either directly on the saddle or by interposing a shim plate, if it is desired to change the distance of the working spindle from a certain reference plane, such as a plane defined by the saddle guides on the saddle carrier. The bearing arrangement adopted for the hollow shaft and consisting in a holder which, in accordance with the invention, is adjustable, allows the user of the machining unit to match the hollow shaft to the different possible positions of the axis of the working spindle which may be due to inaccuracies or may result from intentionally made displacements, and thereby to ensure that the axial displacements of the working spindle which are required in use are not impeded by jamming between the working spindle and the hollow shaft; in the same way, that risk can be excluded which consists in that due to misalignments between the working spindle and the hollow shaft, the replacement or the displacement of the spindle unit formed by the spindle housing and the working spindle results in inadmissible loads on the bearings and in consequent degradations of the working accuracy.

In the case of a substantially horizontal orientation of the axis of the working spindle, the dead weight of the hollow shaft and of the transmission components connected therewith could render it more difficult to ensure an accurate matching of the position of the hollow shaft to a changed position of the axis of the working spindle. However, in a preferred embodiment that is avoided by supporting the holder by a spring so that it may follow a vertical displacement of the spindle housing in a substantially counter-balanced state. Also in this connection, it is an advantage if, for the purpose of its vertical adjustment, the holder is guided between rollers which, in turn, are horizontally displaceable in a direction transverse to the axial direction of the working spindle. Preferably, the possibility for displacement results from the fact that the rollers are supported on bearing pins which are excentrically mounted on angularly adjustable retaining pins.

Preferably, a locking device for arresting the holder is provided which permits the holder to be pressed in a direction parallel to the axial direction of the working spindle against a housing wall integrally connected with the saddle carrier.

This last-mentioned feature may be so designed that the holder is provided with a bearing bush and an end plate of which the bearing bush extends through a through-slot in the housing wall and receives bearings in which the hollow shaft is supported, and that the locking device comprises a nut which is screwed on a threaded portion of the bearing bush, urges a locking plate against an outer surface of the housing wall and thus tightens the end plate against an internal face of the housing wall.

Conveniently, the locking plate has embedded therein springs which bear against the outer surface of the housing wall, whereby the end plate of the holder is held in abutment on the internal face of the housing wall even with the locking device released. In each of the preceding embodiments of the invention the holder may carry intermediate wheels of the transmission which form a reduction gear between the drive motor and hollow shaft. With the holder designed as described with a bearing bush and an end plate, the intermediate wheels may be carried by an intermediate bearing pin which is parallel to the axial direction of the working spindle and is removably received in a plug-in bore of the end plate of the holder.

BRIEF DESCRIPTION OF THE DRAWINGS

Further features and advantages of the invention will be explained hereafter in more details in connection with exemplary embodiments shown in the drawings, which illustrate:

FIG. 1 a front elevation, partly in section, of a machining unit including a spindle unit and a saddle unit, in accordance with a first embodiment;

FIG. 2 a schematic side view of the machining unit shown in FIG. 1, viewed in the direction of arrow II, with the cover of the housing removed;

FIG. 3 an enlarged sectional view along line III—III of FIG. 2;

FIG. 4 a side view, substantially corresponding to that shown in FIG. 2, of a second embodiment of a machining unit; and FIG. 5 a schematic sectional view, along line V—V, of a part of the machining unit shown in FIG. 4.

The machining unit in accordance with the first embodiment, shown in FIGS. 1-3, is especially suitable for transfer machines. It is composed of a saddle unit 10, a transmission 17 with a drive motor 16, and a spindle unit 30. The saddle unit 10 comprises a saddle carrier 11 and a saddle 13 which is slidably guided thereon and is actuated by the horizontal feed movement as indicated by arrow 12. The saddle carrier 11 is stationary relative to the feed movement shown by the arrow 12 and to the rotational working movememt of the spindle unit 30, while, for purposes of setting the whole machining unit, it may be displaceable and lockable, by means not shown, in the direction indicated by arrow 14 (FIG. 2), for example, i.e. in the direction perpendicular to the plane of drawing of FIG. 1.

The feed movement (arrow 12) of the spindle unit 30 in the direction of the spindle axis is obtained through the displacement of the saddle 13. The rotatory working motion is conferred to the working spindle 15 through a drive motor 16 and a transmission connected therewith in series which, in the first embodiment shown in FIGS. 1-3, is designed as a toothed belt transmission 17 and is arranged inside a transmission housing 18. The transmission housing 18 is fixedly secured to the stationary saddle carrier 11.

The working motion is transmitted to the working spindle 15 through a hollow shaft 31 in the form of a driving bush, mounted non-slidable in the direction of the longitudinal axis and rotatable and driven by the toothed belt transmission 17. A spindle end 32, which is engaged in the hollow shaft 31, has a torque transmitting connection with the latter and is slidable in the direction of the longitudinal axis relative to the hollow shaft 31 during the feed movement (arrow 12) of the spindle unit 30. For the purpose of torque transmission the hollow shaft 31 and the spindle end 32 are formed with a polygonal profile, for example, or are designed as a splined shaft or in another suitable manner.

The hollow shaft 31 is displaceably and adjustably mounted on the transmission housing 18 in a direction transversely to its longitudinal axis, namely, on the one hand, in a vertical direction shown by arrow 33, i.e. substantially perpendicularly to the feed direction shown by arrow 12, and, on the other hand, in a lateral direction as indicated by arrow 34 (FIG. 3), which is also transverse to the feed direction shown by arrow 12, and this in such a way that the hollow shaft 31 follows a vertical displacement of the spindle unit 30 in the direction shown by arrow 33, the hollow shaft 31 being again lockable in the new position without there occurring a constraint between the hollow shaft 31 and the working spindle 15, and that, when replacing the spindle unit 30 with another one, the hollow shaft 31 is first adjustable in the direction shown by arrow 34 before the vertical displacement in the direction of arrow 33 is made.

The spindle unit 30 is vertically displaceable in the direction of arrow 33 through an inclined base 19 mounted on the saddle 13, and is further slidable axially of the working spindle 15 on the saddle 12.

As is best seen in FIG. 1, the hollow shaft 31 is rotatably mounted in a generally slide-like holder 37 by means of bearings 35 and 36, but is not slidable axially. The holder 37 itself is mounted on the transmission housing 18 for displacement and adjustment transversely to the longitudinal axis of the hollow shaft 31. The holder 37 consists of a bearing bush 38, joined at the left, as shown in FIG. 1, by a flat and, in plan view, rectangular end plate 39. The hollow shaft 31 extends through both the bearing bush 38 and the end plate 39.

In order to accommodate the holder 37 with the bearings 35, 36 and the hollow shaft 31, the transmission housing 18 is formed, in a housing wall 20, with a through-slot 21 aligned in the vertical direction shown by arrow 33, through which the bearing bush 38 of the holder 17 extends, and whose extension in the vertical direction shown by arrow 33 comes to the range of vertical displacement plus the diameter of the bearing bush 38, and whose extension in the transverse direction, i.e. in the direction shown by arrow 34 in FIG. 3, exceeds the diameter of the bearing bush 38, by for example, only a slight amount sufficient for the purpose of lateral adjustments, so that, as shown in FIG. 3, the bearing bush 38 is adjustable in the through-slot 21 in the lateral direction as shown by arrow 34 within a small lateral play a, as indicated. As can be seen in FIGS. 1 and 3, the bearing bush 38 is mounted with its end carrying the end plate 39 accommodated within the transmission housing 18 and with its opposite or right end, as shown in FIG. 1, outside of the transmission housing 18, this latter end facing the spindle end 32 of the spindle unit 30 which is received in the hollow shaft 31, thus facing to the right, as shown in FIG. 1.

To end plate 39 of the holder 37, through its major surface 40 which faces the housing wall 20, is in close contact with an internal flat face 22 of the housing wall 20 which surrounds the through-slot 21, the end pate 39, after a lateral adjustment in the direction of arrow 34 and/or a vertical displacement in the direction of arrow 33 has been made for the whole holder 37 and the components included therein, being adapted to be tightened against the flat face 22 of the housing wall 20 axially of the bearing bush 38 by means of a locking device 41. The locking device 41 comprises an eye-nut 42, mounted on a threaded portion 43 of the bearing bush 38, which is exterior to the transmission housing 18, and also a locking plate 44 through which the bearing bush 38 extends and which, when the eye-nut 42 is tightened, can be pressed by the latter against the outer surface 23 of the housing wall 20 of the transmission housing 18. The locking plate 44 comprises compression springs 68 which bear against the housing wall 20 and prevent the holder 37 from tipping after the eye-nut 42 has been loosened.

It is evident that the dimensions of the end plate 39, when measured in the longitudinal and transverse directions of the through-slot 21, are each substantially larger than those of the through-slot 21, and that they are such that in, preferably, any selected position of displacement the major surface 40 of the end plate 39 is in close abutting contact over a relatively large area of surface with the flat face 22 all around the through-slot 21.

As can be best seen in FIGS. 2 and 3, an adjustable vertical guide in form of a roller guide 51 is arranged inside of the transmission housing 18 and along which the holder 37 with the hollow shaft 31 is rollingly guided for vertical displacement in the direction of arrow 33 after the locking device 41 has been released. The roller guide 51 engages the two longitudinal narrow sides 52 and 53 of the end plate 39 of the holder 37. For each of these longitudinal narrow sides 52 and 53 of the end plate 39 it comprises two freely rotatable guiding rollers 54 and 55 and 56 and 57, respectively, vertically spaced in the direction of arrow 33 and each of which is in rolling contact with the respective longitudinal narrow side 52 or 53 of the end plate 39 (FIGS. 2 and 3). As shown for the two upper guiding rollers 54 and 56 (FIG. 3), each of the guiding rollers 54 to 57 is mounted on a bearing pin 58 and 59, respectively, for free rotation, but substantially held against axial sliding movement. Each of the bearing pins 58 and 59, respectively, is keyed to, and excentrically mounted on, a retaining pin 60 and 61, respectively, the latter being pivotable, for adjustment purposes, and lockable in the housing wall 20 of the transmission housing 18. Each of the retaining pins 60 and 61 is provided with a threaded portion 62 and 63, respectively, and is formed, on its free end, with a driving surface, engageable by a tool, in form of a square end 64 or 65, respectively. Both of them project out of the outer surface 23 of the housing wall 20 so that they are easily accessible from the outside. A nut 66 or 67, respectively, is screwed onto the threaded portion 62 or 63, by means of which the respective one of the retaining pins 60 and 61 may be locked in the housing wall 20 in the corresponding angular position set. This provides a sensitive displacement of the holder 37 and thus the hollow shaft 31 in the lateral direction shown by arrow 34 for the purpose of offsetting tolerances.

As is shown in FIG. 2, the holder 37, and more specifically its end plate 39, is supported from below by at least one spring 45, mounted on a centering spigot 46 within the transmission housing 18, in such a way that the holder 37 inclusive of its components is substantially counter-balanced.

On its end which is positioned within the transmission housing 18 and is remote from the spindle unit 30, the hollow shaft 31 projects axially beyond the bearing bush 38 and the end plate 39 of the holder 37 and has a toothed belt sprocket 47 keyed to this end. The sprocket 47 is mounted on the hollow shaft 31 for easy replacement and is axially spaced from the bearing 36 by a spacer bush 48. An eye-nut 49 which is screwed onto a respective threaded portion of the hollow shaft 31 serves for replaceably locking the toothed belt sprocket 47.

Another component of the toothed belt transmission 17 is formed by a toothed belt sprocket 25 which is keyed to the journal 24 of the drive motor 16 and is also positioned within the transmission housing 18. Both of the toothed belt sprockets 25 and 47 are coupled to each other to form a transmission by a toothed belt 26 which is extended around both of them. The toothed belt transmission 17 comprises also a respective belt tensioning roller 28 which is displaceable along an adjustment slot 27 and may be locked in position. The tensioning roller 28 can be seen in the embodiment shown in FIG. 2 where it engages the lower end of the belt in a tensioning manner.

When replacing the spindle unit 30 with another one, the various operations to be effected for compensating small tolerances in a direction transverse to the spindle axis, i.e. in the direction of arrow 34 (FIG. 3), and for displacing the spindle unit 30 vertically for setting, are as follows. In the case of vertical displacement in the direction shown by arrow 33, the eye-nut 42 will be loosened to such an extent that the end plate 39 will be released to some extent in the axial direction, but will be sufficiently pressed through its major surface 40 against the flat face 22 all around the through-slot 21, by means of the compression springs 68. This prevents the holder 37 from tipping downwards, as shown in FIG. 1. Also, the belt tensioning roller 28 will be loosened, so that the toothed belt 26 will also allow the vertical displacement (arrow 33) to be made. Then, the spindle unit 30 together with the holder 37 can be displaced vertically in the direction of arrow 33 with an exceptionally easy movement, for in an upward shifting, as shown in FIG. 1, for example, this displacing movement may be assisted by the pre-loaded spring 45 which, at least, acts to resiliently support the holder 37 and the loads acting upon it from below so that the holder 37 with all of the components attached thereto is substantially counterbalanced. When the spindle unit 30 is then shifted upward in the vertical direction shown by arrow 33, for example, the holder 37 will follow the working spindle 15 in this displacement. Thus, the spindle unit 30 and the slide-like holder 37 may be displaced as a unit in an almost floating manner in the vertical direction shown by arrows 33. The sliding movement is made easy by the roller guide 51 having the guiding rollers 54 to 57 adjacent the longitudinal narrow sides 52 and 53 of the end plate 39 of the holder 37. Thus, the holder 37 is guided, in the vertical direction, in a rolling and very smooth running manner. The occurrence of possible distortions between the spindle end 32 of the working spindle 15 and the hollow shaft 31 is avoided due to the easy running of the vertical guide of the holder 37.

After completion of the vertical displacement in the direction of arrow 33 the eye-nut 42 is re-tightened so that the end plate 39 is now tightly drawn through its major surface 40 against the flat face 22 of the housing wall 20, as is the locking plate 44 against the outer surface 23 of the housing wall 20. From the foregoing it is evident that such vertical displacements in the direction of arrow 33 are easy to effect, especially made rapidly and without causing any problems.

When a spindle unit 30 has been replaced with another one, first, and prior to a vertical displacement, the lateral position of the spindle unit 30 and the holder 37, respectively, will be adjusted so that the working spindle 15 is exactly centered relative to the hollow shaft 31.

To effect this adjustment, the eye-nut 42 and the nuts 66 and 67 are also loosened to some extent so that subsequently, by driving at their square ends 64 and 65, respectively, the retaining pins 60 and 61 can be rotated about their longitudinal centre axis within the housing wall 20. The off-centre alignment of the bearing pins 58 and 59 relative to the axis of the respective retaining pin 60 and 61 results in that rotation of the retaining pin 60 or 61 about its longitudinal centre axis produces a transverse displacement of the respective bearing pin 58 or 59 and thus of the guiding roller 54 or 56 which is mounted thereon. As a result, the bearing bush 38 of the holder 37 can be displaced within the through-slot 21 in the direction of arrow 34 by an amount equal to the play a. Upon completion of the lateral adjustment in the direction of arrow 34, the nuts 66 and 67 and, of course, the eye-nut 42 are tightened in the position reached. Then, a vertical displacement may follow.

The second embodiment shown in FIGS. 4 and 5 is an alternative to the first embodiment only as far as the transmission is concerned. Therefore, parts similar to those of the first embodiment of FIGS. 1–3 have been designated by reference numerals increased by 100. The second embodiment of FIGS. 4 and 5 has been obtained, in respect of the transmission, by modifying the transmission of the first embodiment shown in FIGS. 1 and 3. While in the first embodiment the toothed belt transmission 17 provides only a single transmission ratio, in the second embodiment of FIGS. 4 and 5 a two-stage transmission has been obtained. To this effect, and differently from the first embodiment, the driving wheel on the hollow shaft 131 has not been designed as a toothed belt sprocket, but, instead, is formed as a toothed gearwheel 170. Also in the second embodiment, the driving pinion, which is mounted on the journal 124 of the drive motor 116, has the form of a toothed belt sprocket 125. In the second embodiment, the toothed belt 126, which engages the sprocket 125, is extended around an intermediate wheel 171 designed as a toothed belt sprocket. Together with a transmission intermediate wheel 172 in the form of a toothed gearwheel, which is coaxially mounted on, and keyed to, the intermediate wheel 171, the latter is freely rotatably and removably mounted on an intermediate bearing pin 174 by means of a bearing sleeve 173. The intermediate bearing pin 174 is removably mounted on the holder 137, more specifically, on its end plate 139. To this effect, the latter is provided with a plug-in bore 175 which can be seen also in FIGS. 1 and 2 of the first embodiment in which it is designated by 75. The intermediate bearing pin 174 carrying the pair of wheels 171 and 172 is inserted into this plug-in bore 175 of the end plate 139. The transmission intermediate wheel 172 is positioned in the same vertical plane as the toothed gear wheel 170 on the hollow shaft 131 and has meshing engagement with the latter. In this arrangement, and when compared with the first embodiment shown in FIG. 2, the belt tensioning roller 128 has a changed position so that, in the second embodiment, it is adapted to engage the upper end of the toothed belt 126 in a tensioning manner.

If it is desired to change the double-stage transmission in accordance with the second embodiment into a single-stage transmission as in the first embodiment, this may be accomplished rapidly and with simple manipulations. In doing so, it suffices to remove the cover 176 of the transmission housing 118. Then, the belt tensioning roller 128 is loosened or relocated immediately in the position shown in FIG. 2 without, however, tightening it for the time being. By loosening the eye-nut 149 on the hollow shaft 131, the toothed gearwheel 170 may be removed from the latter and be replaced with the toothed belt sprocket 147 of the first embodiment, as indicated by dash-dotted lines in FIG. 5. Further, the intermediate bearing pin 174, with the bearing sleeve 173 and the two intermediate wheels 171 and 172 mounted thereon, is removed by withdrawing it from the plug-in bore 175 of the end plate 139. Following this, the toothed belt 126, looped around the toothed belt sprocket 125 on the journal 124, may be extended around the toothed belt sprocket 147 on the hollow shaft 131. Next, the belt tensioning roller 128 is adjusted and screwed down, and the cover 176 replaced. In this way, the double-stage transmission of the second embodiment may be rapidly changed into the single-stage transmission in accordance with the first embodiment.

We claim:
1. A machining unit comprising in combination a saddle carrier;
   a saddle slideably guided on said saddle carrier;
   a spindle unit supported on said saddle, said spindle unit including a working spindle, said saddle being slideable axially of said working spindle for feed motions of the latter;
   a drive motor secured to said saddle carrier;
   a transmission including an input member driven by said drive motor and a hollow output shaft extending around an end portion of said working spindle;
   means coupling said output shaft with said working spindle end portion to facilitate guided axial sliding movement thereof and to impart rotation to said working spindle;
   characterized in that said machining unit further includes a holder member holding said hollow output shaft with releasable lock-and-adjustment means for selectively locating said holder member and said output shaft in a first direction perpendicular to the axial direction of said working spindle and in a second direction perpendicular to the axial direction of said working spindle.

2. A machining unit according to claim 1, in which the axial direction of the working spindle is at least substantially horizontal, characterised in that the holder member (37) is supported by a spring (45) extending substantially in the vertical direction so that it may follow a vertical displacement of the spindle unit (30) in a substantially counter-balanced state.

3. A machining unit according to claim 2, characterised in that, for the purpose of its vertical adjustment, the holder member (37) is guided between rollers (54 to 57) which, in turn, are horizontally displaceable in a direction transverse to the axial direction of the working spindle (15).

4. A machining unit according to claim 3, characterised in that the rollers (54 to 57) are supported on bearing pins (58, 59) which are excentrically mounted on angularly adjustable retaining pins (60, 61).

5. A machining unit according to any of claim 2-4 or 1, characterised in that a locking means (41) for arresting the holder member (37) is provided which permits the holder member (37) to be pressed in a direction parallel to the axial direction of the working spindle (15) against a housing wall (20) integrally connected with the saddle carrier (11).

6. A machining unit according to claim 5, characterised in that the holder member (37) is provided with a bearing bush (38) and an end plate (39) of which the bearing bush (38) extends through a through-slot (21) in the housing wall (20) and receives bearings (35, 36) in which the hollow shaft (31) is supported, and in that the locking means (41) comprises a nut (42) which is screwed on a threaded portion (43) of the bearing bush (38), urges a locking plate (44) against an outer surface (23) of the housing wall (20) and thus tightens the end plate (39) against an internal face (22) of the housing wall (20).

7. A machining unit according to claim 6, characterised in that the locking plate (44) has embedded therein springs (68) which bear against the outer surface (23) of the housing wall (20), whereby the end plate (39) of the holder member (37) is held in abutment on the internal face (22) of the housing wall (20) even with the locking device (41) released.

8. A machining unit according to claim 7, characterised in that the holder member (37) carries intermediate wheels (171, 172) of the transmission (18) which form a reduction gear between the drive motor (16) and the hollow shaft (31).

9. A machining unit according to claim 8 characterised in that the intermediate wheels (171, 172) are carried by an intermediate bearing pin (174) which is parallel to the axial direction of the working spindle (15) and is removably received in a plug-in bore (175) of the end plate (39) of the holder member (37).

* * * * *